United States Patent
Stern

(10) Patent No.: US 9,740,866 B2
(45) Date of Patent: Aug. 22, 2017

(54) AUTOMATIC MEASURING BOOT PROCESS USING AN AUTOMATIC MEASURING PROCESSOR COUPLED TO A MEMORY

(71) Applicant: The Boeing Company, Chicago, IL (US)

(72) Inventor: Allon J. Stern, Leesburg, VA (US)

(73) Assignee: The Boeing Company, Chicago, IL (US)

( * ) Notice: Subject to any disclaimer, the term of this patent is extended or adjusted under 35 U.S.C. 154(b) by 37 days.

(21) Appl. No.: 14/736,205

(22) Filed: Jun. 10, 2015

(65) Prior Publication Data

US 2016/0364570 A1    Dec. 15, 2016

(51) Int. Cl.
*G06F 1/00*    (2006.01)
*G06F 21/57*   (2013.01)

(52) U.S. Cl.
CPC .................................. *G06F 21/575* (2013.01)

(58) Field of Classification Search
CPC .......................... G06F 2221/033; G06F 21/575
USPC .......................... 713/189, 2; 711/163; 726/22
See application file for complete search history.

(56) References Cited

U.S. PATENT DOCUMENTS

| | | | | |
|---|---|---|---|---|
| 8,037,293 | B2 * | 10/2011 | Dale | G06F 21/575 713/2 |
| 9,183,415 | B2 * | 11/2015 | Adam | G06F 21/40 |
| 2004/0073806 | A1 * | 4/2004 | Zimmer | G06F 21/575 713/189 |
| 2005/0141717 | A1 * | 6/2005 | Cromer | G06F 21/575 380/277 |
| 2006/0136708 | A1 * | 6/2006 | Hajji | G06F 21/575 713/2 |
| 2006/0161790 | A1 * | 7/2006 | Hunter | G06F 21/575 713/189 |
| 2008/0046548 | A1 * | 2/2008 | Doran | H04L 12/66 709/222 |
| 2008/0104701 | A1 * | 5/2008 | Peacock | G06F 9/4401 726/22 |
| 2008/0270781 | A1 * | 10/2008 | Ibrahim | G06F 21/57 713/2 |
| 2010/0031012 | A1 * | 2/2010 | Rotondo | G06F 21/575 713/2 |
| 2011/0087872 | A1 * | 4/2011 | Shah | H04L 9/3236 713/2 |

(Continued)

OTHER PUBLICATIONS

Ariel Segall, TPM Provisioning—Day 1, Approved for Public Release: 12-2749; Jan. 2012, Distribution unlimited, (36 pgs).

(Continued)

*Primary Examiner* — Aurel Prifti
(74) *Attorney, Agent, or Firm* — Toler Law Group, PC

(57) ABSTRACT

An apparatus includes a first interface configured to be coupled to a storage device via a first bus. The apparatus includes a second interface configured to be coupled to a system processor (e.g., a central processing unit (CPU), a graphics processing unit (GPU), a digital signal processor (DSP), etc.) via a second bus. The apparatus further includes a processor configured to, during a boot process of the system processor, receive boot code from the storage device via the first interface. The processor is configured to generate a first value based on the boot code. The processor is further configured to provide the boot code to the system processor via the second interface.

20 Claims, 4 Drawing Sheets

(56) References Cited

U.S. PATENT DOCUMENTS

| | | | | |
|---|---|---|---|---|
| 2011/0258426 A1* | 10/2011 | Mujtaba | ............... | G06F 21/57 |
| | | | | 713/2 |
| 2013/0054948 A1* | 2/2013 | Raj | ................ | G06F 9/45558 |
| | | | | 713/2 |
| 2013/0179669 A1* | 7/2013 | Song | ................ | G06F 21/575 |
| | | | | 713/2 |
| 2014/0310510 A1* | 10/2014 | Potlapally | ............ | G06F 9/4401 |
| | | | | 713/2 |
| 2014/0359239 A1* | 12/2014 | Hiremane | ........... | G06F 21/575 |
| | | | | 711/163 |
| 2015/0324588 A1* | 11/2015 | Locke | ............... | G06F 21/562 |
| | | | | 713/2 |
| 2016/0300064 A1* | 10/2016 | Stewart | .............. | G06F 21/575 |

OTHER PUBLICATIONS

Committee Specification, TPM 2.0 Mobile Reference Architecture, Family "2.0", Level 00 Revision 138; Apr. 4, 2014; Public Review, (36 pgs).

TPM Main, Part 1—Design Principles, Specification version 1.2, Revision 116; Mar. 1, 2011; TCG Published, (184 pgs).

TPM Main, Part 2—TPM Structures, Specification version 1.2, Revision 116; Mar. 1, 2011; TCG Published, (201 pgs).

TPM Main, Part 3—Commands, Specification version 1.2, Revision 116; Mar. 1, 2011; TCG Published, (339 pgs).

Using the TPM to Solve Today's Most Urgent Cybersecurity Problems, Trusted Computing Group; May 20, 2014; (40 pgs.).

\* cited by examiner though the present a system and method for
AUTOMATIC MEASURING BOOT PROCESS USING AN AUTOMATIC MEASURING PROCESSOR COUPLED TO A MEMORY

FIELD OF THE DISCLOSURE

The present disclosure relates to a system and method for performing an automatic measuring boot process using an automatic measuring processor coupled to a memory.

BACKGROUND

A processor, such as a central processing unit (CPU), may perform a boot-up process after power-on in order to initialize the processor and various components used to perform processing operations. The boot-up process may begin with the processor reading one or more configuration pins, initializing one or more clocks, and performing a limited number of initialization operations for some peripherals (e.g., a keyboard interface, an output device interface, a memory interface, etc.) of the processor. After initializing the memory interface, the boot process may continue based on boot code stored in a memory that is external to the processor. For example, the boot code may be stored in a memory, such as a solid state storage device, and may be accessed after the memory interface is initialized. The processor may retrieve primary boot code of a primary boot loader from the memory and execute the primary boot code to perform additional initialization operations (e.g., initializing or re-initializing clocks, initializing additional peripherals, etc.). After executing the primary boot code, the processor may access the memory to retrieve secondary boot code of a secondary boot loader. The processor may execute the secondary boot code to complete initialization of a motherboard, to load an operating system, to measure and validate the operating system, and to begin initialization of the operating system.

After executing the secondary boot code or initializing the operating system, the processor may begin performing measurements of code before executing the code. The measurements may be used to verify that the code is provided by a trusted or expected source, and not a malicious entity. However, the processor is not capable of performing measurements on the primary boot code and the secondary boot code prior to execution because the processor is not sufficiently initialized until after execution of the primary boot code and the secondary boot code. If a malicious entity, such as a hacker, alters or replaces the primary boot code or the secondary boot code, the processor may perform unexpected operations or may grant the malicious entity access to secure data. Because the processor does not measure the primary boot code or the secondary boot code, such a security breach would likely go undetected by the processor.

To provide a root of trust for the boot-up process of a system, the processor may be coupled, via an interface (e.g., Serial Peripheral Interface (SPI) bus, an Inter-Integrated Circuit (I2C) bus, a Low Pin Count (LPC) interface, or another interface), to a device (e.g., a microprocessor or an automatic measuring processor) that is configured to act as a "Trusted Platform Module" (TPM) device. A TPM device may perform verification, binding, and/or sealing operations in accordance with one or more standards. As part of a verification process of code executed on or to be executed on the processor, the processor performs "measurements" of the code. As used herein, performing measurements of the code may refer to the processor generating hash values based on the code. The processor may use the hash values to "extend" (e.g., perform extend operations on) registers of the TPM to cause the registers to store values based on the hash value. To perform an extend operation, the processor concatenates a value in a particular register with a new measurement value and then creates a hash value of the concatenated values. For example, the processor may issue an extend instruction that includes a hash value (or other measurement value) and that indicates a particular register, and the TPM may concatenate a value stored at the particular register with the hash value, generate a new hash value based on the concatenated value, and store the new hash value in the particular register. The TPM may generate a TPM quote that includes values stored in registers of the TPM. The TPM may generate a TPM quote signature by signing the TPM quote using a provisioned attestation identity key (AIK). The TPM quote signature may be used to verify that the TPM quote accurately reflects the values stored in the registers.

The TPM device is integrated into the system such that the TPM is re-initialized when the processor is re-initialized (e.g., reset or powered down and powered back on) and is not re-initialized when the processor is not also re-initialized. Code which causes the processor to initialize the TPM device is typically part of the secondary boot code, or part of code that is executed later in the boot-up process than the secondary boot code. Prior to the TPM device being initialized, the TPM device may be unable to perform extend operations on registers in the TPM device.

SUMMARY

In a particular implementation, an apparatus includes a first interface configured to be coupled to a storage device via a first bus. The apparatus includes a second interface configured to be coupled to a system processor (e.g., a CPU, a GPU, a DSP, etc.) via a second bus. The apparatus further includes an automatic measuring processor configured to, during a boot process of the system processor, receive boot code from the storage device via the first interface. The automatic measuring processor is configured to generate a first value (e.g., hash values) based on the boot code. The automatic measuring processor is further configured to provide the boot code to the system processor via the second interface. Thus, the automatic measuring processor may generate hash values based on the boot code prior to the system processor executing a sufficient amount of code to enable the system processor to generate hash values.

In another particular implementation, a method includes, during a boot process of a system processor (e.g., a CPU, a GPU, a DSP, etc.), receiving boot code from a storage device at an automatic measuring processor via a first interface. The method includes generating, at the automatic measuring processor, a first value (e.g., a hash value) based on the boot code. The method further includes providing the boot code from the automatic measuring processor to the system processor via a second interface.

In another particular implementation, a processing system includes a processing unit (e.g., a CPU, a GPU, a DSP, etc.) and a storage device configured to store boot code for use during a boot process of the processing unit. The processing system further includes an automatic measuring processor coupled to the storage device via a first bus and coupled to the processing unit via a second bus. The automatic measuring processor is configured to, during the boot process, receive the boot code from the storage device via the first bus. The automatic measuring processor is configured to generate a value (e.g., a hash value) based on the boot code. The automatic measuring processor is further configured to provide the boot code to the processing unit via the second bus. Thus, the automatic measuring processor may generate hash values based on the boot code prior to the processing unit executing a sufficient amount of code to enable the processing unit to generate hash values.

The features, functions, and advantages that have been described can be achieved independently in various embodiments or may be combined in yet other embodiments, further details of which are disclosed with reference to the following description and drawings.

DETAILED DESCRIPTION

Figure 1:
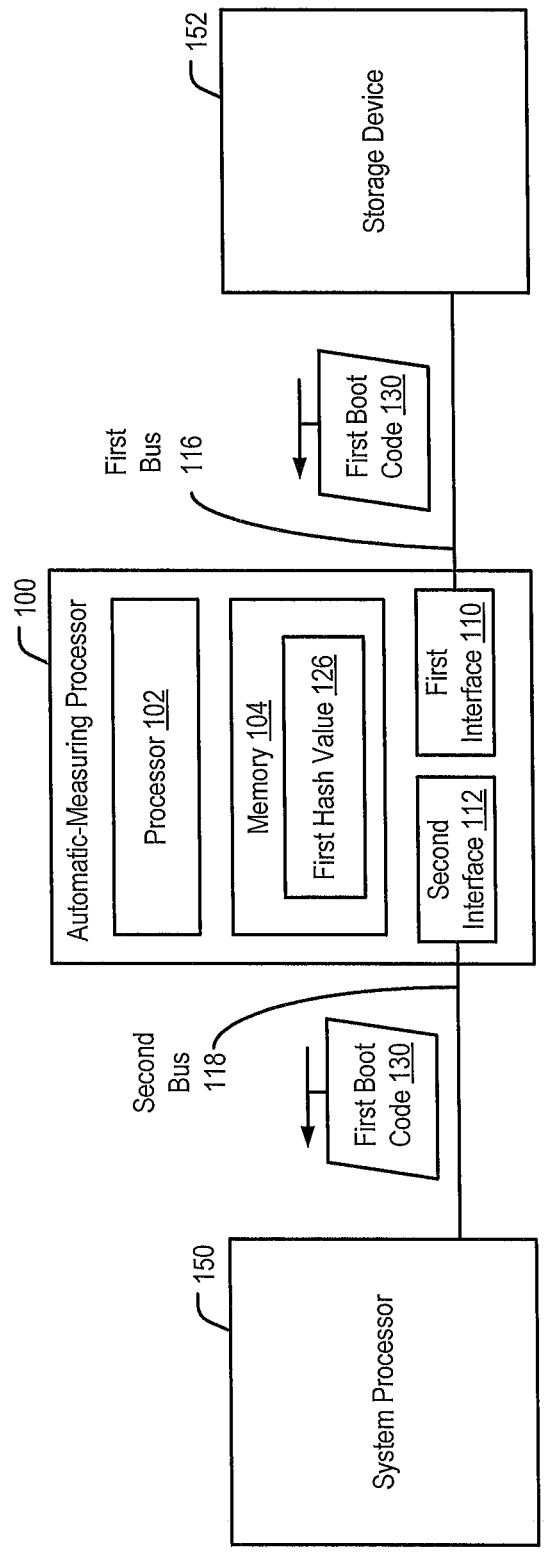
FIG. 1 is a block diagram that illustrates a particular example of a system that includes an automatic measuring processor that generates a value (e.g., a hash value) based on boot code during a boot process of a system processor.

Particular embodiments of the present disclosure are described below with reference to the drawings. In the description, common features are designated by common reference numbers throughout the drawings.

The present disclosure describes systems and methods for providing an automatic measuring boot process that provides additional trust as compared to conventional systems and methods. The boot process may be referred to as "automatic measuring" (e.g., "self-hashing") because hash values (referred to as measurements) may be generated, and a set of registers (e.g., a set of platform configuration registers (PCRs)) within an automatic measuring processor may be automatically "extended" during the boot process. As described herein, a processing system may include a system processor (e.g., a central processing unit (CPU), a graphics processing unit (GPU), a digital signal processor (DSP), etc.), a storage device (e.g., a non-volatile storage device), and an automatic measuring processor coupled to the system processor via a first bus and coupled to the storage device via a second bus. For example, the automatic measuring processor may be coupled to the system processor via a first memory bus and to the storage device via a second memory bus. The automatic measuring processor may be configured to, during a boot process of the system processor, receive boot code from the storage device and to generate value(s) (e.g., hash value(s)) based on the boot code. In some implementations, the hash value(s) may be generated based on memory bus protocol information received from the system processor and/or the storage device. As used herein, the "system processor" refers to a processor that performs data processing operations for the processing system and that is distinct (e.g., separate) from the automatic measuring processor. In some embodiments, the system processor may be a main processor. In other embodiments, the system processor may be a secondary or other processor. Additionally, as used herein, the "automatic measuring processor" refers to any hardware capable of performing measurement operations on boot code during a boot process of the system processor, such as a separate processor, a microprocessor, a controller, a microcontroller, an application-specific integrated circuit (ASIC), a field-programmable gate array (FPGA), other hardware, firmware, or a combination thereof. The automatic measuring processor may also be configured to perform functionality of a trusted platform module (TPM) after the system processor is initialized, as further described herein.

During an initialization process of the automatic measuring processor, values stored in a set of registers may be initialized (e.g., set to an all zero value or an all one value). After initializing the values stored in the set of registers, the automatic measuring processor may generate the hash value(s) during the boot process of the system processor. The hash value(s) may be stored in a log in a memory (e.g., a memory coupled to or integrated in the system processor). The hash value(s) may be generated by the automatic measuring processor prior to the system processor executing a sufficient amount of boot code to enable the system processor to generate hash values. For example, the automatic measuring processor may generate the hash values(s) based on the boot code (e.g., primary boot code and secondary boot code). The automatic measuring processor may perform operations on the set of platform configuration registers using the hash value(s) to modify the initial values stored in the set of registers. For example, the automatic measuring processor may perform an extend operation on a first register of the set of registers to modify a value stored in the first register based on a first hash value. To perform an extend operation, the automatic measuring processor concatenates the value in a particular register with a new measurement value and then creates a hash value (e.g., a resultant hash) of the concatenated values. After completion of the boot process (or after execution of sufficient boot code to enable the system processor to generate hash values and to communicate with the automatic measuring processor), the automatic measuring processor may be configured to perform conventional Trusted Platform Module (TPM) operations, such as performing extend operations initiated by the system processor or generating a TPM quote signature. Because the initial values in the set of registers are modified by the automatic measuring processor prior to an extend operation being initiated by the system processor, extend operations initiated by the system processor may be performed on non-initial (e.g., non-zero) values. Thus, the automatic measuring processor may provide enhanced trust/verification as compared to conventional TPM devices because the automatic measuring processor is able to generate the hash value(s) based on primary boot code and secondary boot code during the boot process of the system processor before the system processor has the capability to perform these measurements.

Additionally, the automatic measuring processor may be configured to operate as a self-encrypted drive controller. For example, the automatic measuring processor may be configured to operate the storage device as a self-encrypted drive (SED). To illustrate, the automatic measuring processor may be configured to generate and store an encryption key that is accessible based on authentication information from the system processor. The encryption key may be used to encrypt or decrypt a portion of data stored at the storage device.

Referring to FIG. 1, a block diagram illustrating a particular example of a system that includes an automatic measuring processor that generates a value (e.g., a hash value) based on boot code during a boot process of a system processor is shown. The system includes an automatic measuring processor 100, a first bus 116, a second bus 118, a system processor 150, and a storage device 152. The automatic measuring processor 100 is coupled to the system processor 150 (e.g., a CPU, a GPU, a DSP, etc.) and to the storage device 152 (e.g., a non-volatile storage device). The automatic measuring processor 100 may be configured to generate one or more values (e.g., hash values) during a boot process of the system processor 150. The system processor 150 may be configured to perform data processing operations for a computing system. The storage device 152 may be configured to store boot code and other data. Additional details of the system processor 150 and the storage device 152 are described with reference to FIG. 3.

The automatic measuring processor 100 includes a processor 102, a memory 104, a first interface 110, and a second interface 112. The memory 104 is accessible to the processor 102. The processor 102 may be configured to execute instructions stored in the memory 104 to perform one or more operations, as further described with reference to FIG. 2. The one or more operations may include generating hash values based on boot code from the storage device 152, as further described herein. The first interface 110 is coupled to the storage device 152 via the first bus 116, and the second interface 112 is coupled to the system processor 150 via the second bus 118. The first bus 116 and the second bus 118 may include or correspond to memory buses, and the first interface 110 and the second interface 112 may include or correspond to memory bus interfaces.

During a boot process of the system processor 150, the system processor 150 (and the automatic measuring processor 100) may perform a read sequence (e.g., one or more read operations) to retrieve boot code from the storage device 152. For example, multiple read operations of a read sequence may be initiated by the system processor 150, and the automatic measuring processor 100 may retrieve first boot code 130 from the storage device 152 based on the read sequence. The first boot code 130 may include boot code of a primary boot code, as further described with reference to FIG. 2. The first boot code 130 may be retrieved in portions during multiple read operations of a read sequence. As each portion of the first boot code 130 is retrieved by the automatic measuring processor 100, the automatic measuring processor 100 may process the portion of the first boot code 130 and provide the portion of the first boot code 130 to the system processor 150. After processing each portion of the first boot code 130 (and providing each portion of the first boot code 130 to the system processor 150), the automatic measuring processor may generate a first hash value 126 based on the first boot code 130. The first hash value 126 may be generated using a cryptographic hash function in accordance with one or more standards. The first hash value 126 may be used to verify that first boot code 130 is expected boot code and not boot code from an unexpected source (e.g., a hacker), as further described with reference to FIG. 2. Because the first hash value 126 is generated based on the first boot code 130 prior to initialization of the system processor 150, the automatic measuring processor 100 is capable of measuring code (e.g., the first boot code 130) that is not measurable by other system processors or other code-measuring modules, as further described with reference to FIG. 2.

Figure 2:
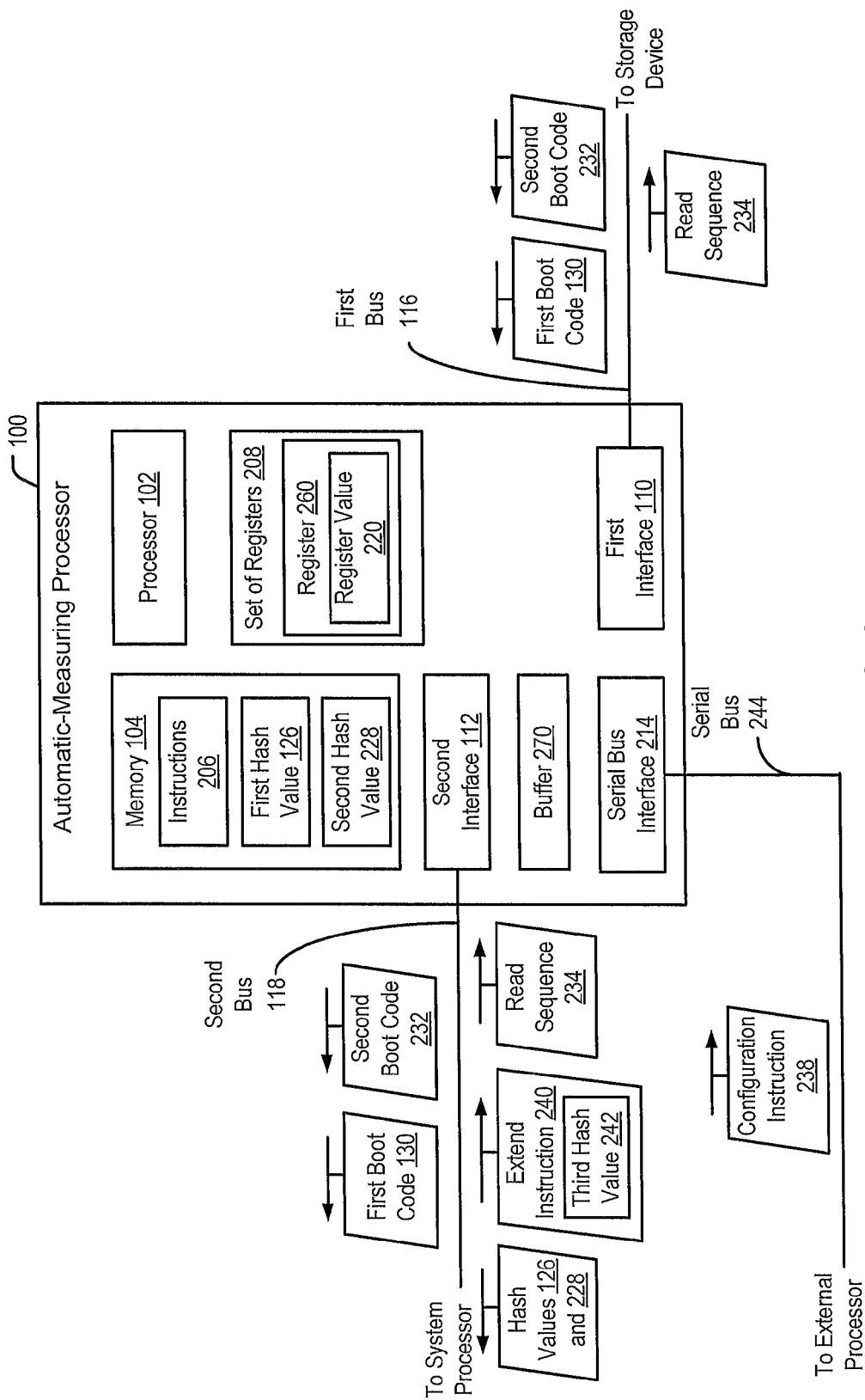
FIG. 2 is a block diagram that illustrates the automatic measuring processor of FIG. 1 in greater detail.

Referring to FIG. 2, a block diagram illustrating the automatic measuring processor 100 in greater detail is shown. The automatic measuring processor 100 is coupled to a system processor (e.g., a CPU, a GPU, a DSP, etc.), such as the system processor 150 of FIG. 1, and to a storage device, such as the storage device 152 of FIG. 1, as further described herein with reference to FIG. 3. As used herein, the "system processor" refers to a processor that performs data processing operations and that is distinct (e.g., separate) from the automatic measuring processor 100. In a particular implementation, the automatic measuring processor 100 may be integrated into the same chip package or device as the system processor, and the storage device may be an embedded storage device that is integrated in the same chip package or device. In other implementations, the storage device may be external to a chip package or device that includes the system processor. The automatic measuring processor 100 may be part of a processing system and may be included in an electronic device. As non-limiting examples, the electronic device may include a computer, a desktop computer, a server, a portable computer, a tablet computer, a personal digital assistant (PDA), a mobile phone, a cellular phone, a satellite phone, a communication device, any other device that executes computer instructions, or a combination thereof.

The automatic measuring processor 100 includes the processor 102 and the memory 104 that stores instructions 206. The processor 102 may be configured to execute the instructions 206 to cause the automatic measuring processor 100 to perform the operations described herein. As a non-limiting example, the processor 102 may execute the instructions 206 to generate a value (e.g., a hash value) based on boot code during a boot-up process of the system processor.

The automatic measuring processor 100 may further include a set of registers 208. For example, the set of registers 208 may include a register 260 and other registers (not illustrated). In other implementations, the set of registers 208 may include more than one register. The set of registers 208 may be referred to as platform configuration registers (PCRs). The set of registers 208 may be configured to be accessed using a limited set of operations. For example, after being initialized, values stored in the set of registers 208 may only be modified by performing extend operations. An extend operation may be based on a particular value and may modify the value at one of the set of registers 208. For example, the extend operation performed on the register 260 may cause the automatic measuring processor 100 to concatenate a register value 220 stored at the register 260 with the particular value associated with the extend operation to generate a concatenated value, generate a hash value based on the concatenated value, and store the hash value as the register value 220 at the register 260. Because modification of the values in the set of registers 208 only occurs through extend operations (after initialization), a particular value may not be stored directly in the set of registers 208.

The automatic measuring processor 100 may further include the first interface 110 coupled to the storage device via the first bus 116 and the second interface 112 coupled to the system processor via the second bus 118. The first interface 110 and the second interface 112 may include or correspond to memory bus interfaces. For example, the first interface 110 may be coupled to the storage device via a first memory bus, and the second interface 112 may be coupled to the system processor via a second memory bus, as further described with reference to FIG. 3. The automatic measuring processor 100 may be coupled between the storage device and the system processor (in contrast to conventional TPM systems where a system processor is generally coupled directly to a storage device via a memory bus). Due to this arrangement, code that is retrieved from the storage device by the system processor may pass through the automatic measuring processor 100 and be processed prior to being provided to the system processor. The automatic measuring processor 100 may further include a serial bus interface 214 that is coupled to the system processor via a serial bus 244. In other implementations, the serial bus interface 214 may be replaced with a low pin count (LPC) bus interface, an inter-integrated circuit (I2C) bus interface, a shared or dedicated command interface, or another interface that is coupled to the system processor, or the automatic measuring processor 100 may include the serial bus interface 214, the LPC bus interface, the I2C bus interface, the shared or dedicated command interface, another interface, or a combination thereof. The automatic measuring processor 100 may further include a buffer 270 configured to buffer boot code from the storage device.

The automatic measuring processor 100 may be configured to be unable to be reset or powered down independently of the system processor, similar to other TPM devices. For example, when the system processor is powered down or reset, the automatic measuring processor 100 is also powered down or reset. When the system processor is powered on, the automatic measuring processor 100 is also powered on. After being powered on, the set of registers 208 may be initialized (e.g., register values, such as the register value 220, may be set to an initial value). During a boot process of the system processor, the automatic measuring processor 100 may be configured to perform one or more operations prior to being configured by the system processor to perform conventional TPM operations. The one or more operations may include generating values, such as hash values, based on boot code or memory bus activity and performing extend operations on the set of registers 208 prior to being configured by the system processor to perform the conventional TPM operations, as further described herein. By performing extend operations during the boot process of the system processor, the automatic measuring processor 100 may modify the register values (e.g., the register value 220) such that extend operations initiated by the system processor are performed on non-zero values, as further described herein.

The system processor performs the boot process to initialize, or re-initialize the system processor and to load code, such as an operating system, in order to perform operations. To begin the boot process, the system processor may execute a small portion of code that includes instructions that cause the system processor to read configuration pins, to initialize one or more clocks, to initialize a memory (e.g., a static random access memory (SRAM)) of the processor, and to initialize one or more peripherals (such as a memory bus interface, an input/output device interface, a display device interface, etc.). The small portion of code may be stored in the system processor during manufacture of the system processor. For example, the system processor may include a read-only memory (ROM) that includes the small portion of code, as further described with reference to FIG. 3. The small portion of code may correspond to general purpose initialization operations (e.g., non-platform specific initialization operations) and thus may be limited to basic initialization operations, such as those described above. In some implementations, the small portion of code stored in the ROM is not be capable of being altered, and is thus referred to as "immutable" code. In other implementations, the small portion of code stored in the ROM is capable of being altered, and is thus referred to as "mutable" code. Additionally or alternatively, the system processor may begin the boot-up process by reading configuration pins that cause the system processor to perform the basic initialization operations. For example, during execution of the small portion of code stored in the ROM, the system processor may read one or more settings from the configuration pins and, based on the one or more settings, may select a particular interface for use during the boot process, may configure an interface with particular predefined parameters, and/or may configure one or more clock settings using particular predefined parameters.

After performing operations based on the small portion of code retrieved from the ROM, the boot process may continue with the system processor retrieving boot code that is stored in the storage device. For example, the system processor may perform a first read sequence 234 (e.g., a sequence of one or more read operations) to read primary boot code of a primary boot loader from the storage device. The primary boot code may include instructions that cause the system processor to perform additional initialization operations, such as initializing or reinitializing clocks for a target platform, initializing additional peripherals used during the boot process, and configuring an additional memory (e.g., a dynamic random access memory (DRAM) or synchronous DRAM (SDRAM)).

The automatic measuring processor 100 may determine that the system processor has performed the first read sequence 234 and may propagate the first read sequence 234 to the storage device. For example, the automatic measuring processor 100 may enable the one or more read operations of the first read sequence 234 to be performed at the storage device. Responsive to performing the first read sequence 234, the automatic measuring processor 100 may receive the first boot code 130 via the first interface 110. In some implementations, the first boot code 130 may be buffered in the buffer 270. The first boot code 130 may correspond to the primary boot code of the primary boot loader associated with the system processor. In some implementations, the storage device is rewritable and the boot code of the boot loaders is mutable code (e.g., code that is potentially alterable or replaceable). In other implementations, the storage device is not rewritable and the boot code of the boot loaders is immutable (e.g., non-alterable) code. Although the first boot code 130 is illustrated as being received as a single transmission based on a single read operation, such illustration is for convenience, and the first boot code 130 may be received in portions over multiple transmissions.

The automatic measuring processor 100 may generate the first hash value 126 based on the first boot code 130. The first hash value 126 may be a cryptographic hash value that is generated in accordance with one or more standards. In a particular implementation, the first hash value 126 may be a 20 byte value generated by performing a cryptographic hash function on the first boot code 130. In a particular implementation, the automatic measuring processor 100 generates a single hash value based on the first boot code 130. For example, the first boot code 130 may be retrieved in a plurality of portions during a read sequence. To illustrate, the first boot code 130 may be retrieved in 32-bit portions (e.g., long words), and multiple read operations may be performed during the read sequence to read the entirety of the first boot code 130. An end of the read sequence may be detected when a read address of a next read instruction is not a next subsequent read address of a previous read address. A single hash value (e.g., the first hash value 126) may be generated based on the entirety of the first boot code 130. In a particular implementation, the first hash value 126 is generated after all portions of the first boot code 130 are read. For example, after each read operation is performed, the corresponding portion of the first boot code 130 may be provided to the system processor and a next read operation may be performed to retrieve the next portion of the first boot code 130. The system processor may store the first boot code 130 in the SRAM of the system processor and execute the first boot code 130 to perform the operations of the primary boot loader. After all of the portions of the first boot code 130 are read, the first hash value 126 may be generated based on the entirety of the first boot code 130. In some implementations, one or more portions of the first boot code 130 may be buffered in the buffer 270 to enable the automatic measuring processor to generate the first hash value 126. In other implementations, the automatic measuring processor may be configured to "build up" the first hash value 126 as each portion of the first boot code 130 is read. In other implementations, the first boot code 130 may be read using a direct memory access (DMA) operation. In still other implementations, a hash value may be generated based on a portion of the first boot code 130.

After generating the first hash value 126, the automatic measuring processor 100 may perform a first extend operation on the register 260 of the set of registers 208. To perform an extend operation, the automatic measuring processor 100 concatenates a value in a particular register with a new measurement value and then creates a hash value of the concatenated values. The first extend operation may be performed based on the first hash value 126 and a value in the register 260 (e.g., an initial value, such as an all zero value, for the first extend operation). Performing the first extend operation may cause the automatic measuring processor 100 to concatenate the register value 220 with the first hash value 126 to generate a first concatenated value. The automatic measuring processor 100 may generate a new hash value based on the concatenated value and may store the new hash value as the register value 220 (e.g., the register value 220 may be overwritten with the new hash value). Additionally, the first hash value 126 (and any other hash values) may be stored in the memory 104, for example as a log of hash values. The log of hash values may also identify code associated with the hash values. For example, the log of hash values may identify the first hash value 126 (and/or other hash values) as being associated with the first boot code 130.

As part of the operations performed by the primary boot code (i.e., the first boot code 130), the system processor may retrieve secondary boot code of a secondary boot loader from the storage device. The secondary boot code may include instructions that cause the system processor to perform additional initialization operations, such as completing initialization of a motherboard, initializing the automatic measuring processor 100, loading an operating system, and validating the operating system.

To retrieve the secondary boot code, the system processor may perform a second read sequence (not illustrated) to the storage device. The automatic measuring processor 100 may propagate the second read sequence (e.g., one or more read operations) to the storage device. Responsive to performing the second read sequence, the automatic measuring processor 100 may receive second boot code 232 via the first interface 110. For example, the second read sequence may include multiple read operations, and the second boot code 232 may be retrieved by portions. In some implementations, the second boot code 232 may be buffered in the buffer 270. The second boot code 232 may correspond to the secondary boot code of the secondary boot loader associated with the system processor. Although the second boot code 232 is illustrated as being received as a single transmission based on a single read operation, such illustration is for convenience, and the second boot code 232 may be received in portions over multiple transmissions.

The automatic measuring processor 100 may generate a second value based on the second boot code 232. In some implementations, the second value may be a second hash value 228 that is generated based on the second boot code 232 in the same manner that the first hash value 126 is generated based on the first boot code 130. For example, the first hash value 126 and the second hash value 228 may be generated using the same cryptographic hash function. In a particular implementation, the second hash value 228 may be a 20 byte value. The automatic measuring processor 100 may generate the second hash value 228 based on an entirety of the second boot code 232. For example, the second boot code 232 may be retrieved in a plurality of portions, and the second hash value 228 may be "built up" as each portion of the second boot code 232 is read and provided to the system processor. In a particular implementation, the second hash value 228 is generated after all portions of the second boot code 232 are read. For example, after each read operation of the second read sequence is performed, the corresponding portion of the second boot code 232 may be provided to the system processor and a next read operation may be performed to retrieve the next portion of the second boot code 232. The system processor may store the second boot code 232 in the SDRAM (or DRAM) of the system processor and execute the second boot code 232 to perform the operations of the secondary boot loader. After all of the portions of the second boot code 232 are read, the second hash value 228 may be generated based on the entirety of the second boot code 232. In some implementations, one or more portions of the second boot code 232 may be buffered in the buffer 270 to enable the automatic measuring processor to generate the second hash value 228. In other implementations, the second boot code 232 may be read using a direct memory access (DMA) operation. In still other implementations, a hash value may be generated based on a portion of the second boot code 232.

After generating the second hash value 228, the automatic measuring processor 100 may perform a second extend operation on the register 260 of the set of registers 208. The second extend operation may be performed based on the second hash value 228. Performing the second extend operation may cause the automatic measuring processor 100 to concatenate the second register value 220 with the second hash value 228 to generate a second concatenated value. The automatic measuring processor 100 may generate a new hash value based on the second concatenated value and may store the new hash value as the register value 220 (e.g., the register value 220 may be overwritten with the new hash value). Although performing the second extend operation on the register 260 is described, in other implementations the second extend operation may be performed on a register values stored in additional registers of the set of registers 208. The second hash value 228 may be stored in the memory 104, for example as part of the log of hash values. The log of hash values may also identify the second hash value 228 (and/or other hash values) as being associated with the second boot code 232. In some implementations, additional hash values may be generated by the automatic measuring processor 100 based on memory bus protocol information received from the system processor or from the storage device, and additional extend operations may be performed based on the additional hash values.

As part of the operations performed by the secondary boot code (i.e., the second boot code 232), the system processor may configure the automatic measuring processor 100 to perform conventional TPM operations. For example, the system processor may configure the automatic measuring processor 100 to perform extend operations based on extend instructions received from the system processor. As another example, the system processor may configure the automatic measuring processor 100 to generate a TPM quote signature. The TPM quote signature may include a trusted list of values stored in the set of registers 208, as further described herein with reference to FIG. 3. The automatic measuring processor 100 may perform one or more configuration operations in response to receiving a configuration instruction 238 (or sequence of configuration instructions) from the system processor. In a particular implementation, the configuration instruction 238 may be received from the system processor via the serial bus interface 214 (e.g., via the serial bus 244). In other implementations, the configuration instruction 238 may be received via the second interface 112 (e.g., via the second bus 118) or via a dedicated command interface. After performing the one or more configuration operations, the TPM functionality of the automatic measuring processor 100 may be accessible to the system processor (e.g., the system processor may generate additional hash values and may issue extend instructions to the automatic measuring processor 100 based on the additional hash values). Additionally, after performing the one or more configuration operations, the automatic measuring processor 100 may stop generating hash values and stop performing extend operations independently of the system processor.

After performing the one or more configuration operations, the system processor may generate hash values and issue extend instructions to the automatic measuring processor 100. For example, the system processor may generate a third hash value 242 (e.g., a hash value generated based on other code, such as the operating system, applications, etc.) using the same hash function associated with the first hash value 126 and the second hash value 228. The third hash value 242 may be included in an extend instruction 240 that is received from the system processor via the second interface 112 (e.g., via the second bus 118). In other implementations, the extend instruction 240 may be received via the serial bus interface 214 (e.g., via the serial bus 244). In other implementations, measurement values other than hash values may be used with extend instructions to the set of registers 208.

The extend instruction 240 may be an initial extend instruction (e.g., the extend instruction 240 may be a first extend instruction issued by the system processor). In response to receiving the extend instruction 240, the automatic measuring processor 100 may perform a third extend operation (e.g., an initial extend operation) on the register value 220 stored in the register 260. The register value 220 may be a non-zero value. To illustrate, when the automatic measuring processor 100 is powered-on, the values in each register of the set of registers 208 may be initialized to a common value, such as a zero value (e.g., an all zero value). However, because the register value 220 was modified during the boot process of the system processor (e.g., based on the first extend operation), the register value 220 stored in the register 260 is a non-zero value. Accordingly, the initial extend operation issued by the system processor is performed on a non-zero value. This is in contrast to a conventional TPM device, which performs the initial extend operation issued by a system processor on a zero value (or other initial value) because extend operations are not performed on the set of registers 208 during boot processes of a conventional processor.

The automatic measuring processor 100 may perform the extend operation associated with the extend instruction 240 by concatenating the register value 220 with the third hash value 242 to generate a third concatenated value. After generating the third concatenated value, the automatic measuring processor 100 may generate a third hash value based on the third concatenated value. Additionally, the automatic measuring processor 100 may store the third hash value in the register 260 (e.g., by modifying/overwriting the register value 220). Although performing the extend operation on the register 260 is described, in other implementations the extend operation may be performed on any register of the set of registers 208.

Hash values indicated by extend operations issued by the system processor may not be stored in the log of hash values. For example, the system processor may maintain a list of hash values included in extend operations issued by the system processor in a memory, in a different log, or in some other manner. When the log of hash values is provided to a third party, the hash values maintained by the system processor may also be provided. Thus, the log of hash values does not include hash values used to perform extend operations on the set of registers 208 that are issued by the system processor. In some implementations, the log of hash values may be maintained at the automatic measuring processor 100. In other implementations, the log of hash values may be maintained at the system processor after the system processor configures the automatic measuring processor 100 to perform conventional TPM operations. The log of hash values may be provided to a third party for verification, as further described with reference to FIG. 3.

During operation, the system processor and the automatic measuring processor 100 may be powered down or reset. After powering on of the system processor and the automatic measuring processor 100, the system processor may perform a boot process associated with the system processor, as described above, and the automatic measuring processor 100 may be initialized (e.g., values stored in the set of registers 208 may be set to an initial value). During the boot process, the system processor (and the automatic measuring processor 100) may perform the first read sequence 234 to retrieve the first boot code 130 from the storage device. The first boot code 130 may correspond to primary boot code of a primary boot loader associated with the system processor. The automatic measuring processor 100 may generate a first value, such as the first hash value 126, based on the first boot code 130 and may store the first hash value 126 in the memory 104. The automatic measuring processor 100 may provide the first boot code 130 to the system processor for use in the boot process. The automatic measuring processor 100 may also perform the first extend operation on the register 260 based on the first hash value 126.

During execution of the first boot code 130, the system processor (and the automatic measuring processor 100) may perform a second read sequence to retrieve the second boot code 232 from the storage device. The second boot code 232 may correspond to secondary boot code of a secondary boot loader associated with the system processor. The automatic measuring processor 100 may generate a second value, such as the second hash value 228, based on the second boot code 232. The automatic measuring processor 100 may provide the second boot code 232 to the system processor for use in the boot process. Additionally, the automatic measuring processor 100 may perform the second extend operation on the register 260 (or another register of the set of registers 208) based on the second hash value 228. During execution of the second boot code 232, the system processor may provide the configuration instruction 238 to the automatic measuring processor 100 to configure the automatic measuring processor 100 to perform conventional TPM functionality. After performing one or more configuration operations, the automatic measuring processor 100 may stop generating hash values based on code retrieved from the storage device. Additionally, the automatic measuring processor 100 may receive the extend instruction 240 (e.g., an initial extend instruction issued by the system processor) and may perform an extend operation based on the third hash value 242 to modify the register value 220.

Thus, the automatic measuring processor 100 may be able to generate additional hash values (e.g., measurements) as compared to conventional TPM devices. For example, the automatic measuring processor 100 may be able to generate the first hash value 126 based on the first boot code 130 (e.g., the primary boot code of the primary boot loader) and/or the second hash value 228 based on the second boot code 232 (e.g., the secondary boot code of the secondary boot loader), which conventional TPM devices are not able to generate. Because the automatic measuring processor 100 generates the hash values 126 and 228 during the boot process of the system processor, malicious code may not be executed without being measured, which may enhance the trust provided by the automatic measuring processor 100 as compared to conventional TPM devices.

Figure 3:
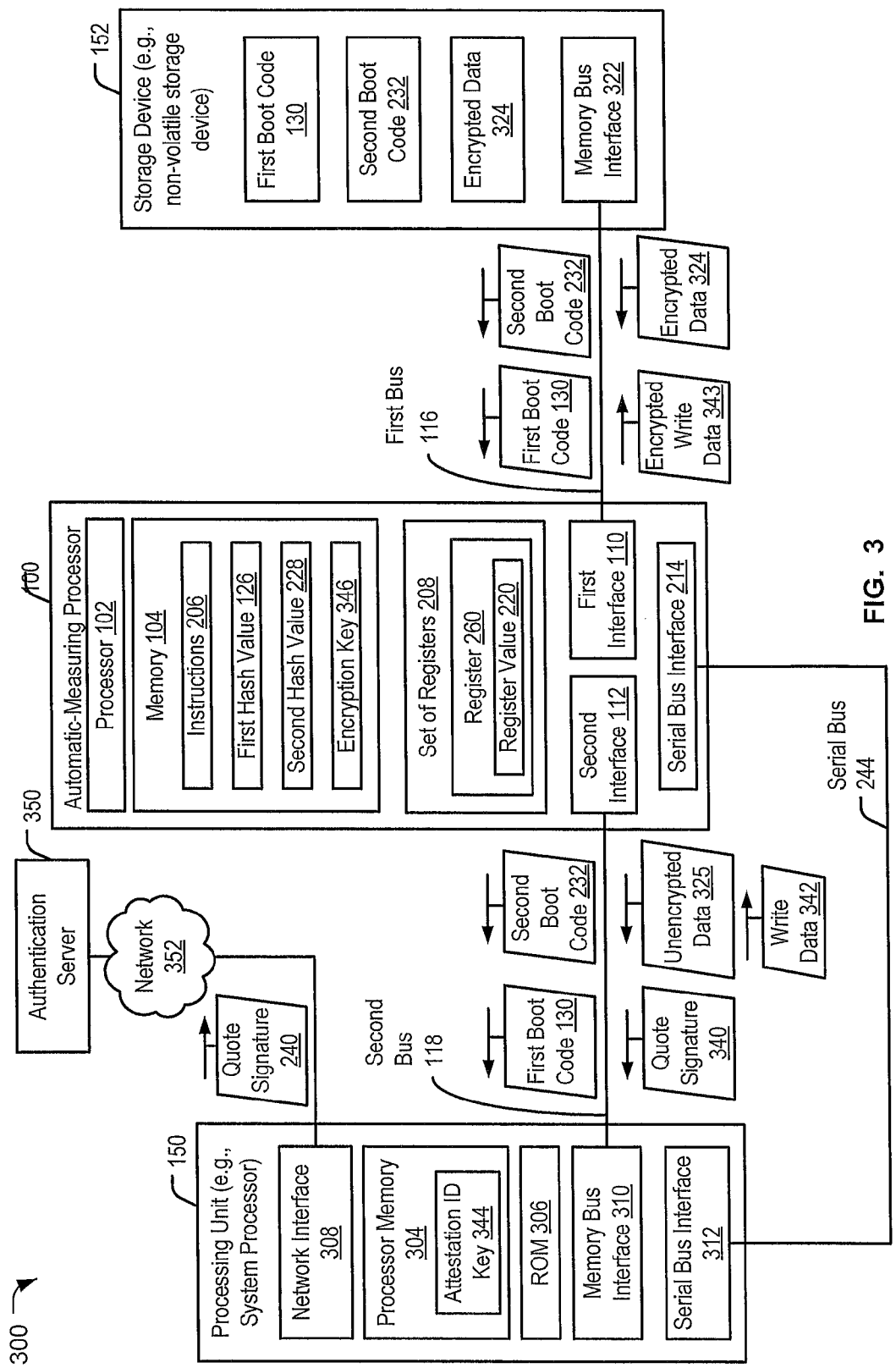
FIG. 3 is a block diagram of the system of FIG. 1 in greater detail.

Referring to FIG. 3, a block diagram illustrating a particular example of a system 300 including the automatic measuring processor 100 is shown. FIG. 3 shows additional details referred to in the description of FIGS. 1 and 2. The system 300 includes the automatic measuring processor 100, a system processor 150 (e.g., a CPU, a GPU, a DSP, etc.), and a storage device 152. The automatic measuring processor 100 may be coupled to the storage device 152 by the first bus 116 and coupled to the system processor 150 by the second bus 118. The automatic measuring processor 100 includes the processor 102, the memory 104, the instructions 206, the set of registers 208, the first interface 110, the second interface 112, and the serial bus interface 214, and the buffer 270, as described with reference to FIG. 2. One or more of the elements described with reference to FIG. 2, such as the buffer 270, are not illustrated in FIG. 3 for convenience.

The system processor 150 may be a central processor, a graphics processor, a digital signal processor, or another processor of a computing device. The system processor 150 may operate as a system processor for the system 300. In a particular implementation, the system 300 may be part of an embedded system in the computing device. The system processor 150 may include a processor memory 304 and a ROM 306. The processor memory 304 may include an SRAM, a DRAM, an SDRAM, or a combination thereof, and may be arranged in a hierarchical arrangement (e.g., a level 1 cache, a level 2 cache, etc.). The processor memory 304 may be used to store data and instructions to be executed by the system processor 150, such as boot code, an operating system, applications, or other instructions. The ROM 306 may include a small portion of code including initialization operations, as described with reference to FIG. 2. The code stored in the ROM 306 may be immutable code, and thus unlikely to be replaced with malicious code.

The system processor 150 may further include a network interface 308 that is configured to be communicatively coupled to a network 352. The network 352 may include a wired network and/or a wireless network, such as a "wi-fi" network or an Institute of Electrical and Electronics Engineers (IEEE) 802.11 network, a satellite network, a Bluetooth network, a near-field communication network, an infrared communications network, another communication network, or a combination thereof. The system processor 150 may further include a memory bus interface 310 that is coupled to the automatic measuring processor 100 via the second bus 118. The memory bus interface 310 may be configured to receive data from and/or to provide data to the automatic measuring processor 100 via the second bus 118. The system processor 150 may further include a serial bus interface 312 that is coupled to the automatic measuring processor 100 via the serial bus 244. The serial bus interface 312 may be configured to receive data from and/or to provide data to the automatic measuring processor 100 via the serial bus 244. In other implementations, the serial bus 244 may be replaced with another bus, such as an LPC bus, an I2C bus, or a dedicated or shared command interface, or another bus or interface. In other implementations, the system 300 may include the serial bus 244, the LPC bus, the I2C bus, the dedicated or shared command interface, another bus or interface, or a combination thereof.

The storage device 152 may be coupled to the automatic measuring processor 100. The storage device 152 may include a memory bus interface 322 coupled to the automatic measuring processor 100 via the first bus 116. The storage device 152 may be a non-volatile storage device. In a particular implementation, the storage device 152 may be a flash memory device, and the first bus 116 and the second bus 118 may be flash memory buses. In another particular implementation, the storage device 152 may be an embedded multimedia card (eMMC) device, and the first bus 116 and the second bus 118 may be eMMC buses.

The storage device 152 may be configured to store code for execution by the system processor 150. For example, the storage device 152 may store the first boot code 130, the second boot code 232, and encrypted data 324. The first boot code 130 may correspond to primary boot code of a primary boot loader associated with the system processor 150, and the second boot code 232 may correspond to secondary boot code of a secondary boot loader associated with the system processor 150. The encrypted data 324 may correspond to an operating system, application code, other code to be executed by the system processor 150, data, or a combination thereof.

The automatic measuring processor 100 may be configured to receive the first boot code 130 from the storage device 152 via the first interface 110 during a boot process of the system processor 150. For example, as described with reference to FIG. 2, the automatic measuring processor 100 may perform one or more read operations (e.g., the first read sequence 234) to retrieve the first boot code 130. In response to the read operation, the storage device 152 may provide the first boot code 130 via the first bus 116 to the automatic measuring processor 100. After receiving the first boot code 130, the automatic measuring processor 100 may generate a first value based on the first boot code 130. For example, the automatic measuring processor 100 may generate the first hash value 126 based on the first boot code 130. The automatic measuring processor 100 may provide the first boot code 130 to the system processor 150 via the second bus 118. The automatic measuring processor 100 may also perform the first extend operation on the register value 220 of the register 260 based on the first hash value 126, as described with reference to FIG. 2. Additionally, the automatic measuring processor 100 may receive the second boot code 232 and generate a second value (e.g., the second hash value 228) based on the second boot code 232. The automatic measuring processor 100 may also perform the second extend operation on the register value 220 of the register 260 (or another register of the set of registers 208) based on the second hash value 228, as described with reference to FIG. 2. Additional hash values may be generated based on memory bus protocol information received from system processor 150 of the storage device 152, and additional extend operations may be performed based on the additional hash values.

After the system processor 150 configures the automatic measuring processor 100 to perform conventional TPM functionality, the automatic measuring processor 100 may generate a quote signature 340. The quote signature 340 may be referred to as a TPM quote signature or a PCR quote signature. The quote signature 340 may include a list of values stored at the set of registers 208 (e.g., the PCRs). For example, the quote signature 340 may include the register value 220 and/or one or more other register values. The quote signature 340 may be signed using an attestation identification (ID) key 344 that is stored at the system processor 150 (e.g., in the processor memory 304 or in another memory accessible to the system processor 150) and accessible to the automatic measuring processor 100. For example, a signature value of the quote signature 340 may be generated based on the attestation ID key 344, the quote signature 340 may be encrypted and/or packaged based on the attestation ID key 344, or a combination thereof. The attestation ID key 344 may be generated based on an endorsement key (not illustrated) that is programmed in the automatic measuring processor 100 by a manufacturer of the automatic measuring processor 100. The attestation ID key 344 may be generated in accordance with one or more TPM standards. After signing the quote signature 340 with the attestation ID key 344, the automatic measuring processor 100 may provide the quote signature 340 to the system processor 150. In a particular implementation, the quote signature 340 may be provided via the serial bus interface 214 (e.g., via the serial bus 244). In an alternative implementation, the quote signature 340 may be provided via the second interface 112 (e.g., via the second bus 118).

The system processor 150 may provide the quote signature 340 and the log of hash values to the authentication server 350 via the network 352. The log of hash values may include the hash values used to perform extend operations on the set of registers 208 during the boot process of the system processor 150 and may identify code associated with the hash values. The authentication server 350 may perform extension operations using the values in the log of hash values and may compare the results to the register values included in the quote signature 340 to verify whether the log of hash values correctly represents software executed by the system processor 150. The authentication server 350 may trust that the register values included in the quote signature 340 are the actual values stored in the automatic measuring processor 100 due to the quote signature 340 being signed by the attestation ID key 344. If the results of the extension operations based on the log of hash values match the register values included in the quote signature 340, the authentication server 350 may determine that the system processor 150 is executing code corresponding to the log of hash values. If the results of the extension operations based on the log of hash values do not match the register values included in the quote signature 340, the authentication server 350 may determine that the system processor 150 is executing code other than code corresponding to the log of hash values, such as malicious code. In this case, the system processor 150 may be quarantined as an infected endpoint. In other implementations, the operations performed by the authentication server 350 may be performed by the system processor 150, either automatically or by a user. Additional or alternative verification operations may also be performed based on the quote signature 340 and the log of hash values.

In a particular implementation, the automatic measuring processor 100 may function as a self-encrypted drive (SED) controller and may operate the storage device 152 as a SED. The automatic measuring processor 100 may generate and store one or more encryption keys associated with the storage device 152, such as encryption key 346. After generating the encryption key 346, the automatic measuring processor 100 may access the encryption key 346 based on authentication information received from the system processor 150. For example, after the automatic measuring processor 100 is re-initialized, the automatic measuring processor 100 may receive the authentication information from the system processor 150 (e.g., after at least partial completion of the boot-up process), and after receiving the authentication information, the automatic measuring processor 100 may access the encryption key 346 and use the encryption key 346 to encrypt and/or decrypt data and other information provided to or received from, respectively, the storage device 152.

To illustrate, the storage device 152 may include multiple logical volumes (e.g., partitions) including a plain-text (e.g., unencrypted) volume and an encrypted volume. The unencrypted volume may include the first boot code 130 and the second boot code 232, and the encrypted volume may include the encrypted data 324. During the boot process, the automatic measuring processor 100 may provide the first boot code 130 and the second boot code 232 to the system processor 150 without performing encryption or decryption, and execution of the first boot code 130 and/or the second boot code 232 may cause the system processor 150 to provide the authentication information to the automatic measuring processor 100. After receiving the authentication information, the automatic measuring processor 100 may use the encryption key 346 to decrypt data retrieved from the storage device 152 and to encrypt data provided to the storage device 152. For example, when the automatic measuring processor 100 receives write data 342 from the system processor 150, the automatic measuring processor 100 may encrypt the write data 342 using the encryption key 346 and may provide encrypted write data 343 to the storage device 152 for storage. As another example, when the automatic measuring processor 100 retrieves the encrypted data 324 (or other data/information) from the storage device 152, the automatic measuring processor 100 may decrypt the encrypted data 324 (or other data/information) using the encryption key 346 and may provide unencrypted data 325 (or other data/information) to the system processor 150. In this manner, the automatic measuring processor 100 may operate as a SED controller to encrypt and decrypt data stored at the storage device 152. Operating as the SED controller enables the automatic measuring processor 100 to provide additional functionality that is not provided by conventional TPM devices.

Figure 4:
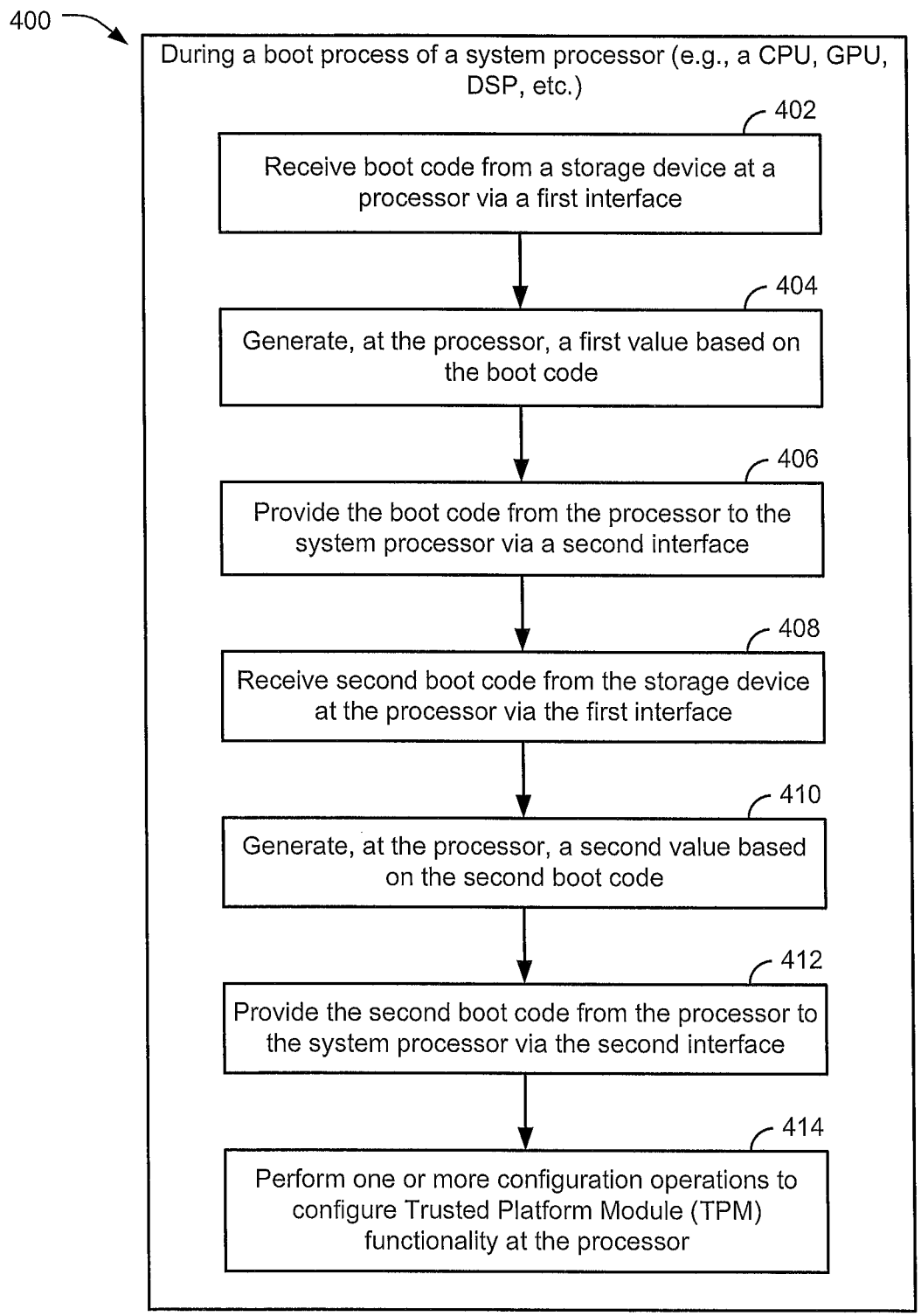
FIG. 4 is a flow chart of a particular example of a method of generating a hash value based on boot code during a boot process of a system processor.

Referring to FIG. 4, a method 400 of generating a hash value based on boot code during a boot process of a system processor (e.g., a processor that is external to an automatic measuring processor) is shown. The system processor may be a CPU, a GPU, a DSP, or another processing unit. In a particular implementation, the method 400 may be performed at the automatic measuring processor 100 of FIGS. 1-3.

The method 400 includes receiving boot code from a storage device at a processor (e.g., of an automatic measuring processor) via a first interface, at 402. For example, with reference to FIG. 1, the processor 102 of the automatic measuring processor 100 may receive the first boot code 130 from the storage device 152 via the first interface 110.

The method 400 includes generating, at the processor, a first value based on the boot code, at 404. For example, with reference to FIG. 1, the processor 102 of the automatic measuring processor 100 may generate the first hash value 126 based on the first boot code 130. The first hash value 126 may be stored in the memory 104 of the automatic measuring processor 100, (e.g., at a log of hash values).

In a particular implementation, the method 400 may include performing a first extend operation on a first register value based on the first value, the first register value stored in a first register of a set of registers. For example, with reference to FIG. 2, the automatic measuring processor 100 may perform the first extend operation on the register value 220 stored at the register 260 based on the first hash value 126. Performing the first extend operation may include concatenating the first register value (e.g., a zero value when the first extend operation is performed after initializing the first register) with the first value to generate a first concatenated value. Performing the first extend operation may also include generating a first hash value based on the first concatenated value and storing the first hash value in the first register. For example, with reference to FIG. 2, the automatic measuring processor 100 concatenates the register value 220 with the first hash value 126 to generate the concatenated value. The automatic measuring processor 100 also generates a new hash value based on the concatenated value and stores the new hash value in the register 260 (e.g., modifying or overwriting the register value 220).

The method 400 includes providing the boot code from the processor to the system processor via a second interface, at 406. For example, with reference to FIG. 1, the processor 102 of the automatic measuring processor 100 may provide the first boot code 130 to the system processor 150 via the second interface 112.

The method 400 includes receiving second boot code from the storage device at the processor via the first interface, at 408. For example, with reference to FIG. 2, the processor 102 of the automatic measuring processor 100 may receive the second boot code 232 from the storage device (e.g., the storage device 152 of FIG. 1) via the first interface 110.

The method 400 includes generating, at the processor, a second value based on the second boot code, at 410. For example, with reference to FIG. 2, the processor 102 of the automatic measuring processor 100 may generate the second hash value 228 based on the second boot code 232. The second hash value 228 may be stored in the memory 104 of the automatic measuring processor 100 (e.g., at the log of hash values).

In a particular implementation, the method 400 may include performing a second extend operation on a second register value based on the second value, the second register value stored in a second register of the set of registers. The second register may be the first register or a different register. For example, with reference to FIG. 2, the automatic measuring processor 100 may perform the second extend operation on the register value 220 stored at the register 260 based on the second hash value 228. Alternatively, the automatic measuring processor 100 may perform the second extend operation on the register value 220 stored at the register 260 based on the second hash value 228. Performing the second extend operation may include concatenating the second register value with the second value to generate a second concatenated value. Performing the second extend operation may also include generating a second hash value based on the second concatenated value and storing the second hash value in the second register. For example, with reference to FIG. 2, the automatic measuring processor 100 may concatenate a register value of another register (or of the register 260) with the second hash value 228 to generate the second concatenated value. The automatic measuring processor 100 may also generate a new hash value based on the second concatenated value and store the new hash value in the register 260 (e.g., modify or overwrite the register value 220).

The method 400 includes providing the second boot code from the processor to the system processor via the second interface, at 412. For example, with reference to FIG. 2, the processor 102 of the automatic measuring processor 100 may provide the second boot code 232 to the system processor (e.g., the system processor 150 of FIG. 1) via the second interface 112.

The method 400 further includes performing one or more configuration operations to configure TPM functionality at the processor, at 414. For example, with reference to FIG. 2, the automatic measuring processor 100 may perform one or more configuration operations based on the configuration instruction 238. After performing the one or more configuration operations, TPM functionality of the automatic measuring processor 100 may be accessible to the system processor (e.g., the system processor 150), and the automatic measuring processor 100 may stop generating hash values and performing extend operations independently of the system processor.

In a particular implementation, the method 400 may further include receiving an extend instruction indicating a third hash value from the system processor and performing a third extend operation on a third register value based on the third hash value and the third register value stored in a third register of the set of registers. The third register may be the first register or a different register. For example, with reference to FIG. 1, the automatic measuring processor 100 may receive the extend instruction 240 (e.g., an initial extend instruction issued by the system processor) that includes the third hash value 242. The automatic measuring processor 100 may perform the third extend operation on the register value 220 stored in the register 260 based on the third hash value 242. Alternatively, the automatic measuring processor 100 may perform the third extend operation on a different register value stored in a different register. The third hash value 242 may be generated by the system processor based on other code, such as an operating system or application code, after the system processor has performed the boot process.

In another particular implementation, the method 400 may include generating a quote signature that includes a list of register values stored in the set of registers and providing the quote signature to the system processor. The quote signature may be signed using an attestation ID key stored at the processor. For example, with reference to FIG. 3, the automatic measuring processor 100 may generate the quote signature 340 (indicating the values stored at the set of registers 208) and may sign the quote signature 340 using the attestation ID key 344. After signing the quote signature 340, the automatic measuring processor 100 may provide the quote signature 340 to the system processor (e.g., the system processor 150).

In another particular implementation, the method 400 may include generating an encryption key associated with the storage device and storing the key at the processor. For example, with reference to FIG. 3, the automatic measuring processor 100 may generate the encryption key 346 and may store the encryption key 346 in the memory 104 of the automatic measuring processor 100. In a particular implementation, the encryption key 346 may be accessible based on authentication information received from the system processor 150. Additionally, the method 400 may include decrypting data from the storage device using the key prior to providing the data to the system processor. For example, with reference to FIG. 3, the automatic measuring processor 100 may decrypt data (e.g., the encrypted data 324) retrieved from the storage device 152 using the encryption key 346 prior to providing the unencrypted data 325 to the system processor 150. Additionally, the automatic measuring processor 100 may encrypt the write data 342 using the encryption key 346 prior to providing the encrypted write data 343 to the storage device 152 for storage.

The method 400 of FIG. 4 may be initiated or controlled by a processing unit, such as a central processing unit (CPU), a graphics processing unit (GPU), a digital signal processor (DSP), a controller, an application-specific integrated circuit (ASIC), a field-programmable gate array (FPGA) device, another hardware device, a firmware device, or any combination thereof.

The illustrations of the examples described herein are intended to provide a general understanding of the structure of the various implementations. The illustrations are not intended to serve as a complete description of all of the elements and features of apparatus and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. For example, method steps may be performed in a different order than shown in the figures or one or more method steps may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific examples shown. This disclosure is intended to cover any and all subsequent adaptations or variations of various embodiments. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single example for the purpose of streamlining the disclosure. As the following claims reflect, the claimed subject matter may be directed to less than all of the features of any of the disclosed examples.

Examples described above illustrate but do not limit the disclosure. It should also be understood that numerous modifications and variations are possible in accordance with the principles of the present disclosure. Accordingly, the scope of the disclosure is defined by the following claims and their equivalents.

What is claimed is:

1. An apparatus comprising:
   a first interface configured to couple to a storage device via a first bus;
   a second interface configured to couple to a system processor via a second bus; and
   a processor comprising the first interface and the second interface, the processor configured to couple to the storage device via the first interface and to couple to the system processor via the second interface, and configured to:
   during a boot process of the system processor:
   receive boot code from the storage device via the first interface;
   generate a first value based on the boot code; and
   send the boot code to the system processor via the second interface.

2. The apparatus of claim 1, wherein the first value is a hash value generated based on the boot code, and wherein the hash value generated based on the boot code is stored in a memory of the processor.

3. The apparatus of claim 1, further comprising a set of registers accessible to the processor.

4. The apparatus of claim 3, wherein the processor is further configured to perform an extend operation on a register value stored in a register of the set of registers and to store a resultant hash value in the register, and wherein the resultant hash value is based on the first value generated by the processor.

5. The apparatus of claim 3, wherein the boot code corresponds to a primary boot loader associated with the system processor, and wherein the processor is further configured to, during the boot process of the system processor:
   receive second boot code from the storage device via the first interface, wherein the second boot code corresponds to a secondary boot loader associated with the system processor;
   generate a second value based on the second boot code; and
   provide the second boot code to the system processor via the second interface.

6. The apparatus of claim 5, wherein processor is further configured to perform an extend operation on a second register value stored in a second register of the set of registers and to store a second resultant hash value in the second register.

7. The apparatus of claim 6, wherein the processor is further configured to:
   receive an extend instruction indicating a third hash value from the system processor; and
   perform a third extend operation on a third register value based on the third hash value, the third register value stored in a third register of the set of registers.

8. The apparatus of claim 1, further comprising a memory configured to store instructions that, when executed by the processor, cause the processor to generate the first value during the boot process of the system processor.

9. The apparatus of claim 1, wherein the first interface and the second interface comprise memory bus interfaces.

10. The apparatus of claim 1, wherein the processor is further configured to perform a read operation on the storage device to retrieve the boot code in response to determining that the system processor performed a read operation and to send the boot code to the system processor independent of a result of a hash performed by the processor on the boot code.

11. A method comprising:
    during a boot process of a system processor:
    receiving boot code from a storage device at a processor via a first interface of the processor;
    generating, at the processor, a first value based on the boot code; and
    sending the boot code from the processor to the system processor via a second interface of the processor.

12. The method of claim 11, further comprising performing a first extend operation on a first register value based on the first value, the first register value stored in a first register of a set of registers within the processor.

13. The method of claim 12, further comprising:
receiving an first extend instruction from the system processor; and
performing a second extend operation on the first register value based on the first extend instruction, wherein the first register value is a non-zero value.

14. The method of claim 12, further comprising:
generating a quote signature that includes a list of register values stored in the set of registers, wherein the quote signature is signed using an attestation identity key stored at the processor; and
providing the quote signature to the system processor.

15. The method of claim 11, further comprising:
after providing the boot code to the system processor, generating an encryption key associated with the storage device; and
storing the encryption key at the processor.

16. The method of claim 15, further comprising decrypting data from the storage device using the encryption key prior to providing the data to the system processor.

17. A processing system comprising:
a processing device;
a storage device configured to store boot code for use during a boot process of the processing device; and
a processor coupled to the storage device via a first bus and coupled to the processing device via a second bus, the processor configured to, during the boot process:
receive the boot code from the storage device via the first bus;
generate a value based on the boot code; and
send the boot code to the processing device via the second bus.

18. The processing system of claim 17, further comprising a serial bus, wherein the processor is coupled to the processing device via the serial bus, and wherein the first bus and the second bus comprise memory buses.

19. The processing system of claim 17, wherein the value comprises a hash value, and wherein the boot code corresponds to a primary boot loader associated with the processing device.

20. The processing system of claim 17, wherein the storage device comprises a non-volatile storage device.

* * * * *